United States Patent
Detwiler et al.

(10) Patent No.: US 11,110,539 B2
(45) Date of Patent: Sep. 7, 2021

(54) METHODS AND JOINTS FOR WELDING SHEETS OF DISSIMILAR MATERIALS

(71) Applicant: HONDA MOTOR CO., LTD., Tokyo (JP)

(72) Inventors: Duane T. Detwiler, Powell, OH (US); Timothy A. Abke, Zanesfield, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 813 days.

(21) Appl. No.: 15/654,423

(22) Filed: Jul. 19, 2017

(65) Prior Publication Data
US 2018/0036828 A1  Feb. 8, 2018

Related U.S. Application Data

(60) Provisional application No. 62/371,565, filed on Aug. 5, 2016.

(51) Int. Cl.
*B23K 11/11* (2006.01)
*B23K 26/361* (2014.01)
(Continued)

(52) U.S. Cl.
CPC ........... *B23K 11/11* (2013.01); *B23K 11/0026* (2013.01); *B23K 11/166* (2013.01);
(Continued)

(58) Field of Classification Search
CPC ... B23K 11/11; B23K 11/0026; B23K 11/166; B23K 11/185; B23K 11/20;
(Continued)

(56) References Cited

U.S. PATENT DOCUMENTS 3,205,574 A * 9/1965 Brennecke ............. B23K 20/08
228/108
3,256,669 A * 6/1966 Seiwert .................. B62D 33/04
52/789.1
(Continued)

FOREIGN PATENT DOCUMENTS

CN  101108444 A  1/2008

OTHER PUBLICATIONS

Liu et al., Solid-state dissimilar joining of Ti—Fe with Nb and Cu interlayers, Welding Journal, Jul. 2015, vol. 94, p. 219-s thru 224-s (Year: 2015).*
(Continued)

*Primary Examiner* — Dana Ross
*Assistant Examiner* — Michael S. Poetzinger
(74) *Attorney, Agent, or Firm* — Arent Fox LLP (57) ABSTRACT

A method for welding a stack of sheets having a plurality of sheets of different materials is provided. In an aspect, the stack of sheets includes an aluminum sheet and a galvanneal steel sheet. In an aspect, the method includes resistively spot welding the galvanneal sheet to a hot-stamped steel sheet placed between the aluminum sheet and the galvanneal sheet, the sheet of hot-stamped steel including stress relief sections. The method further includes placing a metal foil on the aluminum sheet and vaporizing the metal foil to project portions of the aluminum sheet through the stress relief sections of the hot-stamped steel sheet to weld the portions of the aluminum sheet to the galvanized steel sheet. In another aspect, the method includes placing the metal foil on a raised portion of the aluminum sheet and projecting the raised portion of the aluminum onto the galvanneal steel sheet.

13 Claims, 6 Drawing Sheets

(51) Int. Cl.
  *B23K 11/00* (2006.01)
  *B23K 11/16* (2006.01)
  *B23K 11/18* (2006.01)
  *B23K 11/20* (2006.01)
  *B23K 101/00* (2006.01)
  *B23K 103/04* (2006.01)
  *B23K 103/10* (2006.01)
  *B23K 103/20* (2006.01)
  *B23K 101/34* (2006.01)
  *B23K 101/18* (2006.01)

(52) U.S. Cl.
  CPC ............ *B23K 11/185* (2013.01); *B23K 11/20* (2013.01); *B23K 26/361* (2015.10); *B23K 2101/006* (2018.08); *B23K 2101/185* (2018.08); *B23K 2101/34* (2018.08); *B23K 2103/04* (2018.08); *B23K 2103/10* (2018.08); *B23K 2103/20* (2018.08)

(58) Field of Classification Search
  CPC ............ B23K 2103/10; B23K 2103/20; B23K 2103/04; B23K 2101/006; B23K 11/002; B23K 2103/18; F16B 5/00; F16B 5/08
  USPC ..... 219/78.01, 86.1, 86.22, 91.2, 95, 96, 97, 219/118; 228/115, 228, 208, 2.5, 107, 228/108, 109; 428/594, 600, 649
  See application file for complete search history.

(56) References Cited

U.S. PATENT DOCUMENTS

| | | | | |
|---|---|---|---|---|
| 3,261,088 A | * | 7/1966 | Holtzman | B23K 20/08 228/108 |
| 4,925,084 A | * | 5/1990 | Persson | B23K 20/08 228/107 |
| 5,961,027 A | * | 10/1999 | Szecket | B23K 20/08 228/107 |
| 2013/0283878 A1 | * | 10/2013 | Vivek | B21D 26/021 72/60 |

OTHER PUBLICATIONS

Department of the Army and Department of Energy, Advanced Vehicle Power Technology Alliance Fiscal Year 2014 (FY14) Annual Report, Apr. 30, 2015, pp. 143-155. (Year: 2015).*

Chinese Office Action issued by the Chinese Patent Office in corresponding Chinese Patent Application No. 201710661421.2, dated Sep. 2, 2020.

Chinese Office Action issued in corresponding Chinese Patent Application No. 201710661421.2 dated Apr. 22, 2021.

* cited by examiner

METHODS AND JOINTS FOR WELDING SHEETS OF DISSIMILAR MATERIALS

CROSS-REFERENCE TO RELATED APPLICATIONS

This application claims priority to Provisional Application No. 62/371,565 filed on Aug. 5, 2016, which is hereby incorporated by reference in its entirety.

BACKGROUND

The subject matter disclosed herein relates to methods and corresponding joints for welding sheets of dissimilar materials or alloys.

Friction stir welding is commonly understood as a process to join multiple aluminum workpieces or sheets together. Friction stir welding carries out joining of superimposed sheets by strongly pressing a cylindrical tool having a projection at the tip against the superimposed sheets while rotating the tool, and making an area around the joint part plastically flow and be stirred by means of the rotational force of the tool while making the projection of the tool penetrate into the sheets and generating frictional heat. This heat in turn melts, fuses, or welds the sheets together. Friction stir welding is widely used in various industries that utilize aluminum workpieces or sheets. For example, friction stir welding may be used to manufacture automobiles.

Using certain traditional friction stir welding technologies and methodologies, welding an aluminum sheet together with a sheet of a different material, for example, a sheet of steel, may be difficult to achieve. Current attempts to use traditional resistive spot welding technologies in such applications have led to stress corrosion cracking and have yielded welds that are not suitable for structural use (e.g., to hold panels or pieces together with welds strong enough to, for example, pass crash-test requirements). Consequently, there remains a need in the art for a process to join sheets of dissimilar materials, such as, aluminum and steel.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a method of performing welding is provided. The method includes applying a current to a stack of sheets to resistively spot weld a first sheet of the stack of sheets to a second sheet of the stack of sheets, where the second sheet includes at least one cut out section. The method also includes placing at least one metal foil on a first side of a third sheet of the stack of sheets. The method further includes vaporizing the at least one metal foil to project at least one portion of the third sheet through the at least one cut out section of the second sheet to the first sheet to form a weld.

In another aspect of the present disclosure, a method of performing welding is provided. The method includes cladding a first sheet of a stack of sheets with a transition material. The method also includes raising at least a portion of a second sheet of the stack of sheets at an angle, where the at least one raised portion extends upwardly from an edge of the second sheet. The method further includes placing at least one metal foil on the at least one raised portion of the second sheet. And, the method includes vaporizing the at least one metal foil to project the at least one raised portion of the second sheet onto the first sheet.

In a further aspect of the present disclosure, a method of performing welding is provided. The method includes applying a current to a stack of sheets to resistively spot weld a first sheet of the stack of sheets to a second sheet of the stack of sheets, where the second sheet includes at least one cut out section. The method also includes placing at least one metal foil on a first side of a third sheet of the stack of sheets, where the third sheet is clad with a transition material. And, the method further includes vaporizing the at least one metal foil to project at least one portion of the third sheet through the at least one cut out section of the second sheet to the first sheet to form a weld.

In another aspect of the present disclosure, a vaporized foil actuator welding (VFAW) part is provided. The part includes a first sheet of a stack of sheets resistively spot welded to a second sheet of the stack of sheets at a plurality of weld spots, where the second sheet includes a plurality of cut out sections. The part also includes a third sheet of the stack of sheets welded to the first sheet through the plurality of cut out sections. An alternation of the weld spots and welds in the plurality of cut out sections form a mechanical interlock.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Generally described, the present disclosure provides a method for welding a stack of sheets having a plurality of sheets of different materials. In an aspect, the stack of sheets includes an aluminum sheet and a galvanneal steel sheet. In an aspect, the method may include resistively spot welding the galvanneal sheet to a hot-stamped steel sheet placed between the aluminum sheet and the galvanneal sheet, the sheet of hot-stamped steel including stress relief sections. The method may further include placing a metal foil on the aluminum sheet and vaporizing the metal foil to project portions of the aluminum sheet through the stress relief sections of the hot-stamped steel sheet to weld the portions of the aluminum sheet to the galvanized steel sheet. In another aspect, a method may include placing the metal foil on a raised portion of the aluminum sheet and projecting the raised portion of the aluminum onto the galvanneal steel sheet without using a spacer (e.g., hot-stamped steel sheet) between the aluminum sheet and the galvanneal steel sheet.

Figure 1:
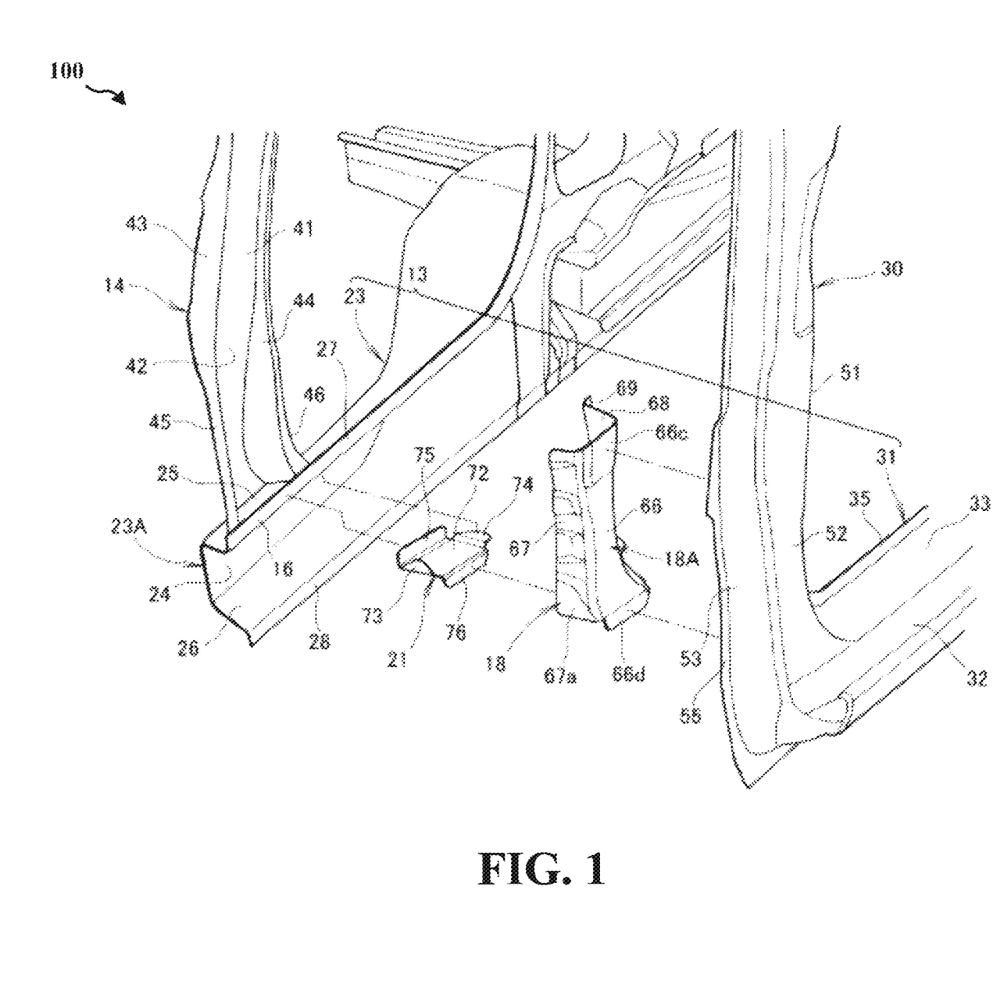
FIG. 1 illustrates an exemplary vehicle side body part structure in accordance with various aspects.

Referring now to the figures, FIG. 1 illustrates an exemplary vehicle side body part structure 100. As shown in FIG. 1, a vehicle body side part structure 100 may include a side sill 13 extending longitudinally along an outer side of a vehicle body (not shown). The side sill 13 may include a side sill inner panel 23 forming an inner side surface of a vehicle cabin and a side sill outer panel 31 joined to an outside-cabin side of the side sill inner panel 23. The side sill inner panel 23 may further include a sill inner panel upper flange 27, and the side sill outer panel 31 may further include a sill outer panel flange 35.

In an aspect, the side sill inner panel 23 and the side sill outer panel 31 may be sheets of different materials. For example, the side sill inner panel 23 may be a sheet of aluminum and the side sill outer panel 31 may be a sheet of steel. However, in accordance with aspects presented herein, the side sill inner panel 23 and the side sill outer panel 31 may be joined by welding flanges 27, 35 of the panels 23, 31 together. It is to be appreciated that the aspects presented herein may also be applied to join other panels of the vehicle body. For example, the aspects presented herein may also be applied to weld a front pillar 14, center pillar (not shown), and/or rear pillar (not shown) of the vehicle body.

Figure 2:
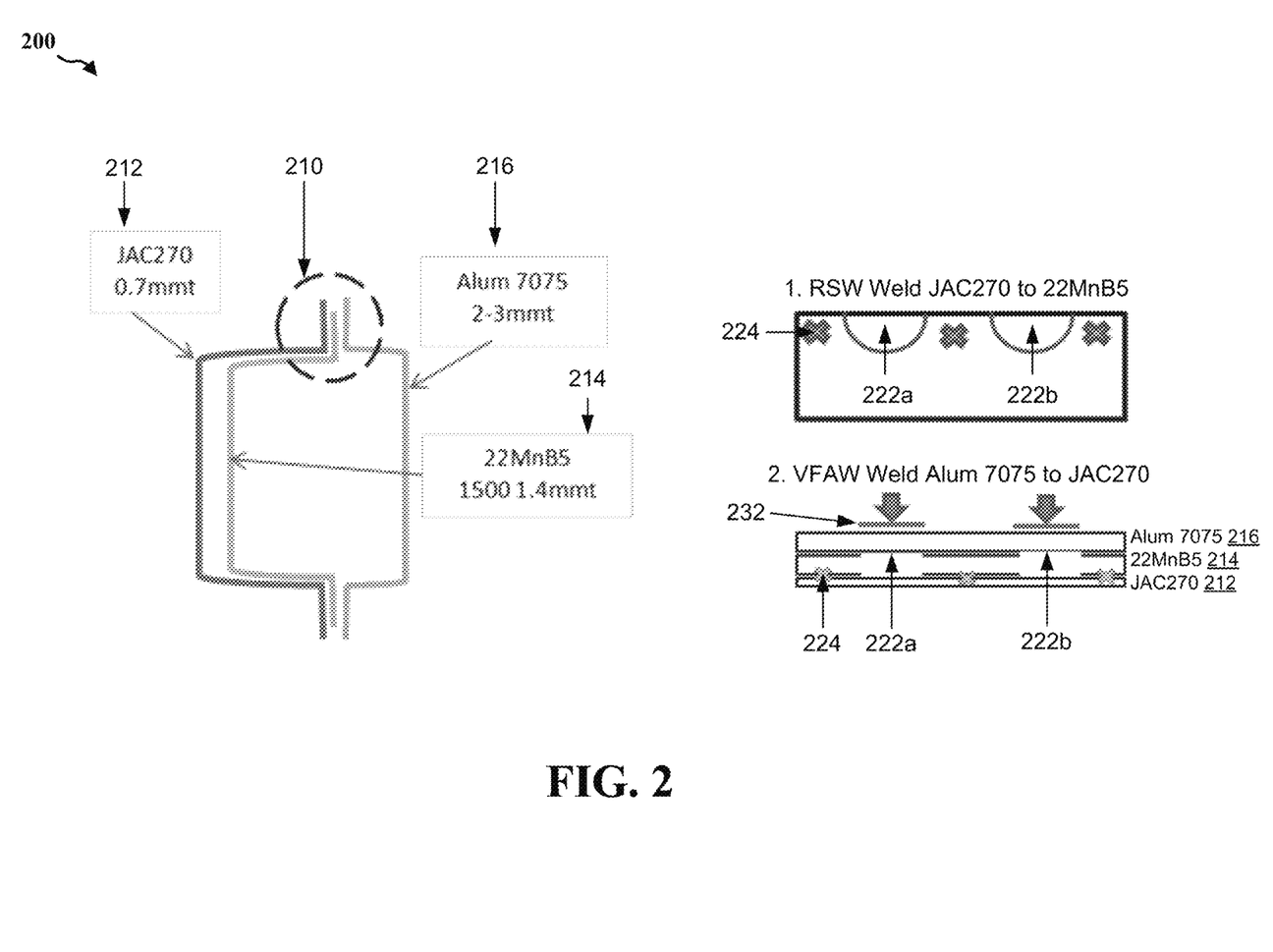
FIG. 2 illustrates an exemplary stack of sheets of different materials to be welded together in accordance with various aspects.

Referring to FIG. 2, an exemplary stack of sheets 210 (e.g., flanges) of different materials is shown in accordance with various aspects. In an aspect, the stack of sheets 210 may include at least three individual sheets of different materials. For example, in an aspect, the stack of sheets 210 may include a sheet of galvanneal steel 212 (for example, JAC270 steel or JSC980 steel) defining a first side of the stack of sheets, a sheet of hot-stamped steel 214 (for example, USIBOR® 1500P steel and/or 22MnB5 steel) adjacent to the sheet of galvanneal steel 212, and a sheet of aluminum or aluminum alloy 216 (for example, Aluminum 7075 or Aluminum alloy A2024) adjacent to the sheet of hot-stamped steel 214 and defining a second side of the stack of sheets 210. In various aspects, an aluminum silicate (AlSi) coating of the hot-stamped steel 214 or a zinc (Zn) coating of the galvanneal steel 212 may be removed to improve a weld between the hot-stamped steel 214, galvanneal steel 212, and/or the sheet of aluminum or aluminum alloy 216. For example, the AlSi coating of the hot-stamped steel 214 or the Zn coating of the galvanneal steel 212 may be removed mechanically by, for example, laser ablation. Alternatively, or additionally, aluminum or aluminum alloy 216 may be clad with a transition material, such as Alum 1100, to improve a weld between the hot-stamped steel 214, galvanneal steel 212, and/or the sheet of aluminum or aluminum alloy 216.

Though three individual sheets are illustrated and described herein, these teachings may be readily applied to stacks of sheets having more than three individual sheets, including four sheets, five sheets, six sheets, or an even higher or lower number of sheets.

In an aspect, a plurality of sections of the sheet of hot-stamped steel 214 may be cut out from the edge of the sheet 214 in order to lighten and/or provide a provision for a standoff/gap in order to facilitate improved weld quality. For example, in an aspect, a plurality of relief sections (e.g., two relief sections 222a, 222b) may be cut from an edge of the sheet of hot-stamped steel 214. In an aspect, the cut out sections 222a, 222b may be, for example, semi-circular cuts.

Figure 3:
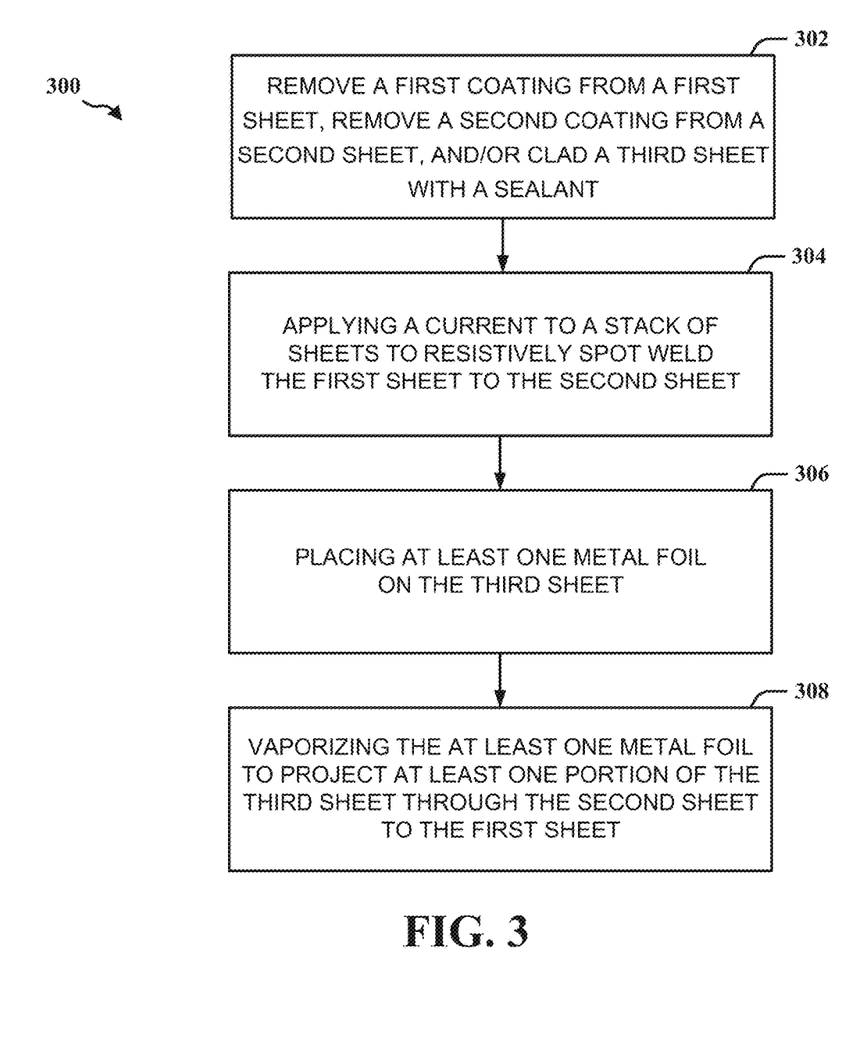
FIG. 3 illustrates an exemplary process flow diagram of a method for welding in accordance with various aspects.

Referring to FIG. 3, a method 300 for welding stack of sheets of different materials is described according to various aspects. FIG. 3 will be described with reference to the components of FIG. 2. In an aspect, method 300 may include, at block 302, removing an aluminum silicate (AlSi) coating of the hot-stamped steel 214 or a zinc (Zn) coating of the galvanneal steel 212. For example, the AlSi coating of the hot-stamped steel 214 or the Zn coating of the galvanneal steel 212 may be removed mechanically by, for example, laser ablation. Alternatively, or additionally, at block 302, method 300 may include cladding the aluminum or aluminum alloy 216 may with a transition material. In an aspect, method 300 may include, at block 304, applying a current to a stack of sheets to resistively spot weld (RSW) a first sheet to a second sheet. In an aspect, the sheet of galvanneal steel 212 may be resistively spot welded to the sheet of hot-stamped steel 214 by applying the current to an outer surface of the sheet of galvanneal steel 212 at a plurality of spots. In an aspect, the sheet of galvannel steel 212 may be resistively spot welded to the sheet of hot-stamped steel 214 at each spot 224 adjacent to or between the plurality of relief sections 222a, 222b of the sheet of hot-stamped steel 214. For example, in an aspect, an inner surface of the sheet of galvanneal steel 212 may be resistively spot welded to a surface of the sheet of hot-stamped steel 214 adjacent to the sheet of galvanneal steel 212 at each of the spots 224.

At block 306, the method 300 may include placing at least one metal foil on a third sheet. In an aspect, a strip of metal foil 232 may be placed on an outer surface of the sheet of aluminum 216 opposite each of the plurality of relief sections 222a, 222b of the sheet of hot-stamped steel 214.

At block 308, the method 300 may include vaporizing the at least one metal foil to project at least one portion of the third sheet through the second sheet to the first sheet. In an aspect, each strip of metal foil 232 may be vaporized to project at least one portion of the sheet of aluminum 216 through the sheet of hot-stamped steel 214 to the sheet of galvannel steel 212. In an aspect, each strip of metal 232 may be vaporized by passing a high current of electricity (e.g., on the order of 4-10 kJ) through each of the metal foils 232. When metal foils 232 are vaporized, reaction forces may be directed toward the sheet of aluminum 216 and a portion of the sheet of aluminum 216 may be projected through each of the relief sections 222a, 222b of the sheet of hot-stamped steel 214 and into the sheet of galvanneal steel 212 to foam a weld between an inner surface of the sheet of aluminum 216 and the inner surface of the sheet of galvanneal steel 212.

Figure 4:
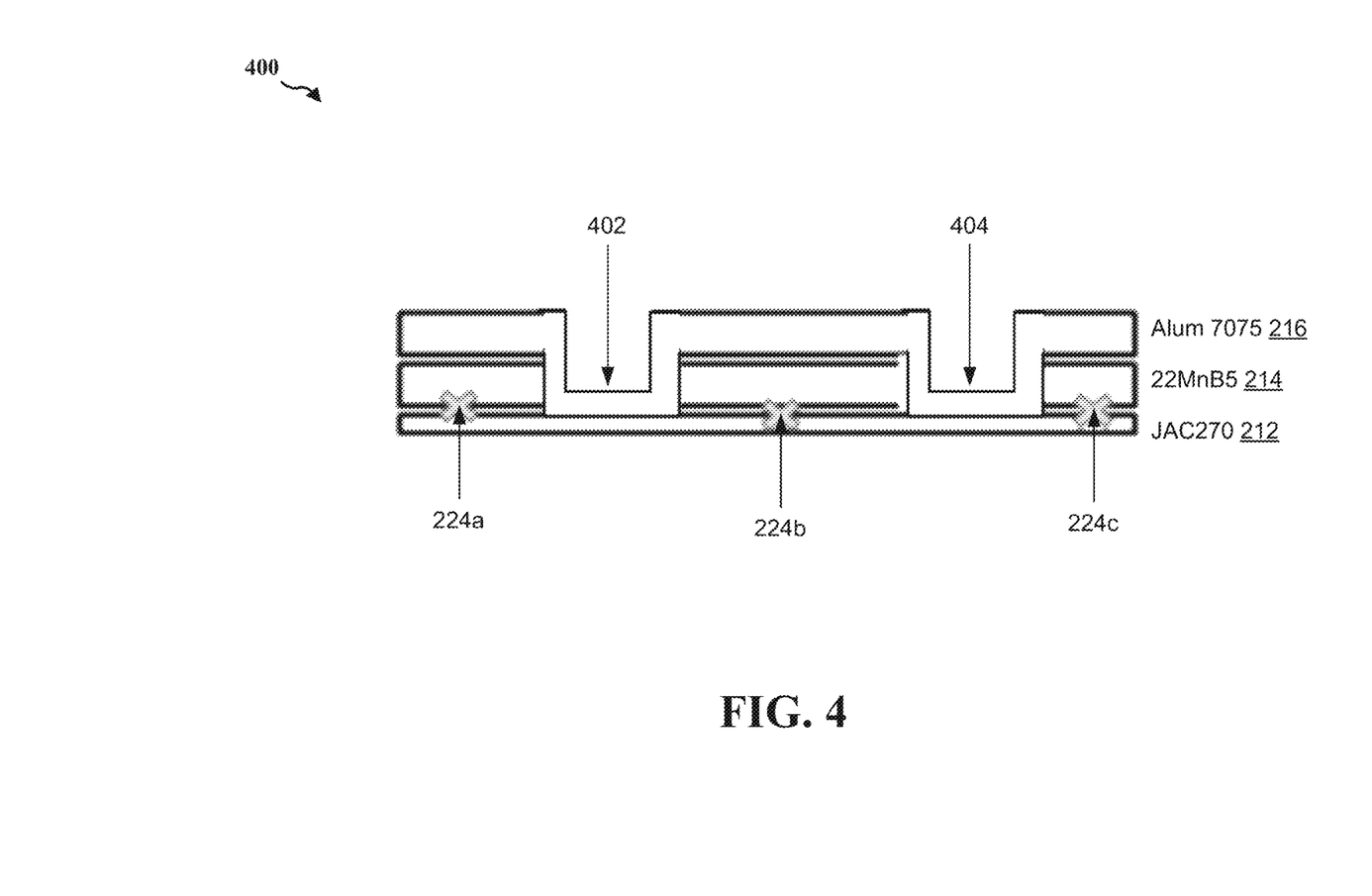
FIG. 4 illustrates an exemplary result of a welding process in accordance with various aspects.

Referring to FIG. 4, an exemplary result 400 of the method 300 (FIG. 3) is illustrated. As described above, in an aspect, the sheet of hot-stamped steel 214 may be resistively spot welded to the sheet of galvanneal steel 212 at spots 224a, 224b, 224c. Moreover, in an aspect, each of the metal foils 232 (FIG. 2) may be vaporized to project portions of the sheet of aluminum 216 through relief sections 402, 404 (see e.g., relief sections 222a, 222b (FIG. 2)). As a result of the projection, the sheet of aluminum 216 may be welded to the sheet of galvanneal steel 212 in the relief sections 402, 404. It is to be appreciated that the alternation of welds at spots 224a, 224b, 224c and welds in the relief sections 402, 404 forms a mechanical interlock suitable for structural use.

Figure 5:
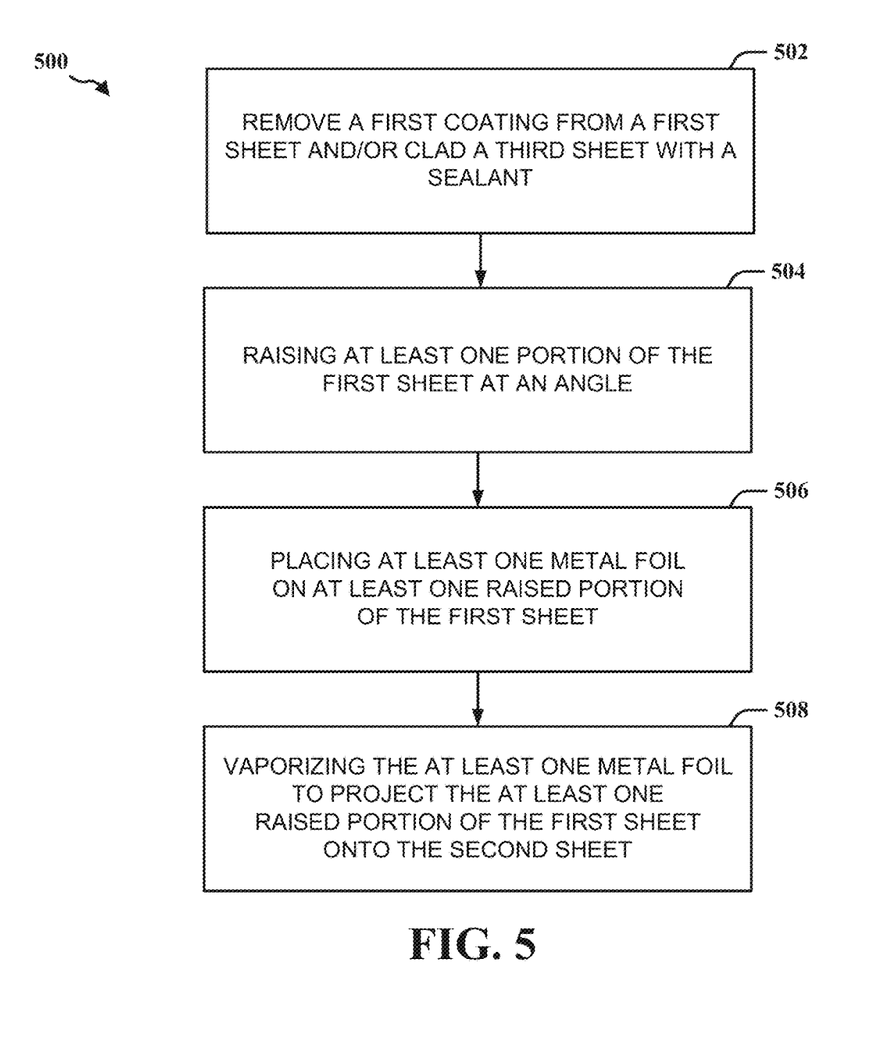
FIG. 5 illustrates an exemplary process flow diagram of a method for vaporizing foil actuator welding (VFAW) in accordance with various aspects.
Figure 6:
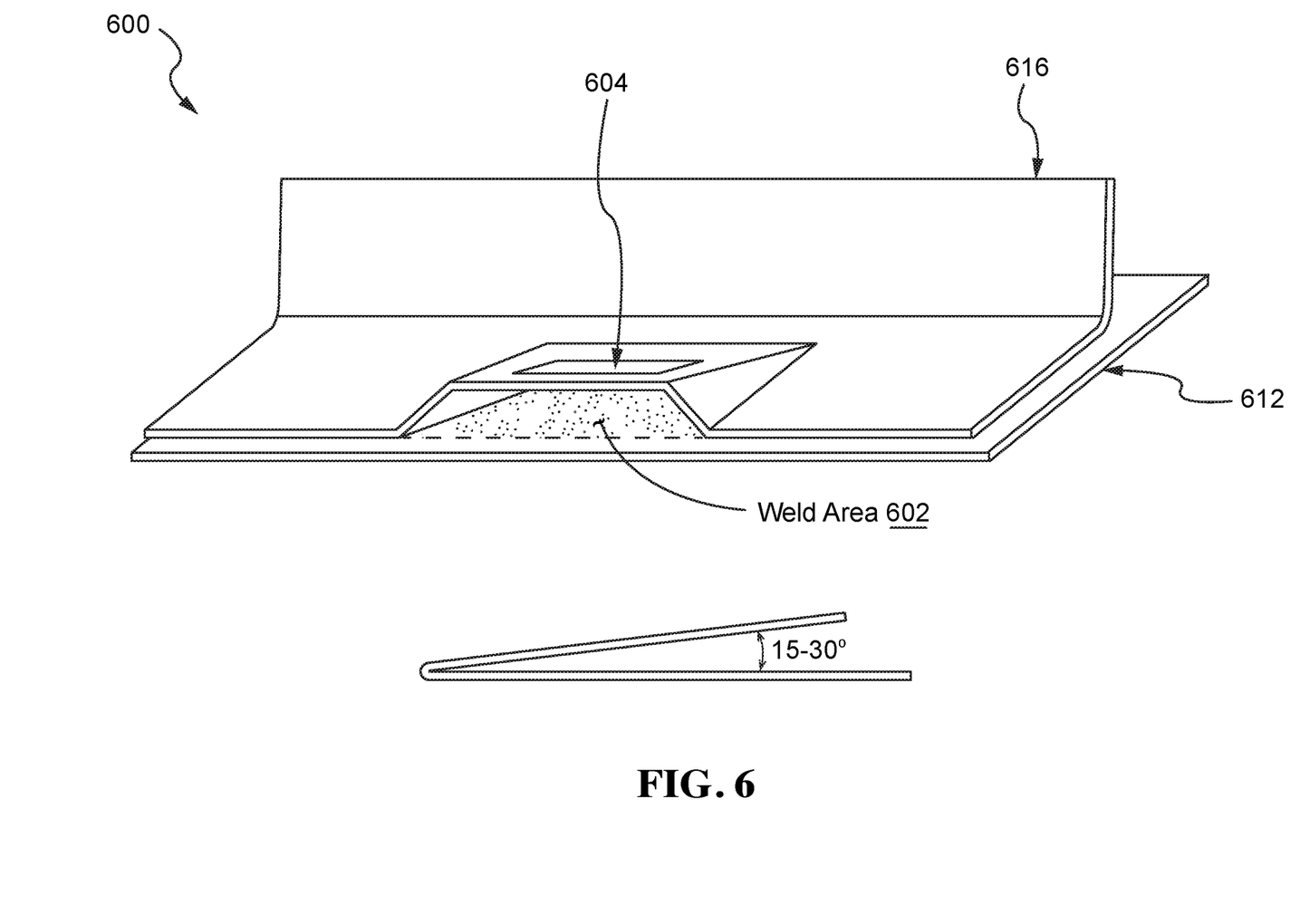
FIG. 6 illustrates an exemplary VFAW welding process in accordance with various aspects.

Turning now to FIG. 5 and FIG. 6, an exemplary vaporizing foil actuator welding (VFAW) method 500 is described according to various aspects. In an aspect, the sheet of aluminum 616 and the sheet of galvanneal steel 612 may be welded together without using a spacer (e.g., sheet of hot-stamped steel 214 (FIG. 1)) in between the sheets 612, 616. In an aspect, method 500 may include, at block 502, removing a zinc (Zn) coating of the galvanneal steel 612. For example, the Zn coating of the galvanneal steel 612 may be removed mechanically by, for example, laser ablation. Alternatively, or additionally, at block 502, method 300 may include cladding the aluminum 616 may with a transition material. In an aspect, the method 500 may include, at block 504, raising at least one portion of a first sheet at an angle. For example, in an aspect, at least one hinge or raised portion may be formed in the sheet of aluminum 616. The raised portion may extend upwardly from the edge of the sheet of aluminum 616 at an angle such as, but not limited to, 10 to 30 degrees.

At block 506, the method 500 may include placing at least one metal foil on the at least one raised portion of the first sheet. For example, in an aspect, a strip of metal foil 604 may be placed on an outer surface of each raised portion of the sheet of aluminum 616.

At block 508, the method 500 may include vaporizing the at least one metal foil to project the at least one raised portion of the first sheet onto a second sheet. For example, in an aspect, the metal foil 604 may be vaporized to project a portion of the raised portion of the sheet of aluminum 616 to the sheet of galvanneal steel 612 such that a weld 602 is formed between an inner surface of the sheet of aluminum 616 and an inner surface of the sheet of galvanneal steel 612. In this case, the weld may extend all the way to the edge of the sheet of galvanneal steel 612. Moreover, it is to be appreciated that forming the raised portion allows for a more consistent weld (e.g., no "donut" shape) between the sheets 612, 616.

The methods and corresponding apparatus have been described such that a stack of sheets of different materials having two or more individual sheets can be reliably welded. The described methods and apparatus allow for an economic, flexible, and efficient welding solution that does not require the cost or inconvenience associated with utilizing a specialized welding device and/or with replacing most existing welding equipment.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments of the disclosure.

What is claimed is:

1. A method of performing welding, the method comprising:
    applying a current to a stack of sheets to resistively spot weld a first sheet of the stack of sheets to a second sheet of the stack of sheets, wherein the second sheet is a unitary vehicle structural component and includes at least two cut out sections, wherein applying the current to the stack of sheets comprises forming at least two spot welds between the first sheet and the second sheet;
    placing at least one metal foil on a first side of a third sheet of the stack of sheets; and
    vaporizing the at least one metal foil to project at least two portions of the third sheet through the at least two cut out sections of the second sheet to the first sheet to form welds between the first sheet and the third sheet, wherein the second sheet remains welded to the first sheet, and wherein the at least two spot welds alternate with the welds through the cut out sections to form a mechanical interlock between the first sheet, the second sheet, and the third sheet.

2. The method of claim 1, further comprising at least one of:
    removing a first coating from the first sheet;
    removing a second coating from the second sheet; or
    cladding the third sheet with a transition material.

3. The method of claim 1, wherein applying the current further comprises:
    applying the current to the stack of sheets to resistively spot weld a first side of the first sheet to a first side of the second sheet.

4. The method of claim 1, wherein vaporizing the at least one metal foil further comprises:
    forming the weld between the first side of the third sheet and a second side of the first sheet.

5. The method of claim 1, further comprising positioning one of the at least two cut out sections of the second sheet at an edge of the second sheet.

6. A method of performing welding, the method comprising:
    applying a current to a stack of sheets to resistively spot weld a first sheet of the stack of sheets to a second sheet of the stack of sheets, wherein the second sheet is a unitary vehicle structural component and includes at least two cut out sections, wherein applying the current to the stack of sheets comprises forming at least two spot welds between the first sheet and the second sheet;
    placing at least one metal foil on a first side of a third sheet of the stack of sheets, wherein the third sheet is clad with a transition material; and
    vaporizing the at least one metal foil to project at least two portions of the third sheet through the at least two cut out sections of the second sheet to the first sheet to form welds between the first sheet and the third sheet, wherein the second sheet remains welded to the first sheet, and wherein the at least two spot welds alternate with the welds through the cut out sections to form a mechanical interlock between the first sheet, the second sheet, and the third sheet.

7. The method of claim 6, further comprising at least one of:
    removing a first coating from the first sheet; or
    removing a second coating from the second sheet.

8. The method of claim 6, wherein applying the current further comprises:
    applying the current to the stack of sheets to resistively spot weld a first side of the first sheet to a first side of the second sheet.

9. The method of claim 6, wherein vaporizing the at least one metal foil further comprises:
    forming the weld between the first side of the third sheet and a second side of the first sheet.

10. The method of claim 6, further comprising positioning the at least one cut out section of the second sheet at an edge of the second sheet.

11. A vaporized foil actuator welding (VFAW) part, the part comprising:
- a first sheet of a stack of sheets resistively spot welded to a second sheet of the stack of sheets at a plurality of weld spots, wherein the second sheet is a unitary vehicle structural component and includes a plurality of cut out sections; and
- a third sheet of the stack of sheets welded to the first sheet through the plurality of cut out sections, wherein an alternation of the weld spots and welds in the plurality of cut out sections form a mechanical interlock.

12. The part of claim 11, wherein:
the first sheet comprises a first type of steel,
the second sheet comprises a second type of steel, and
the third sheet comprises aluminum.

13. The part of claim 12, wherein:
the first type of steel is a galvanneal steel, and
the second type of steel is a hot-stamped steel.

* * * * *